United States Patent
Harley et al.

(10) Patent No.: US 9,520,950 B2
(45) Date of Patent: Dec. 13, 2016

(54) OPTICAL COMMUNICATIONS SYSTEM HAVING CHROMATIC DISPERSION AND POLARIZATION MODE DISPERSION COMPENSATION

(75) Inventors: James Harley, Nepean (CA); Kim Roberts, Nepean (CA); Chuandong Li, Nepean (CA)

(73) Assignee: Ciena Corporation, Hanover, MD (US)

( * ) Notice: Subject to any disclaimer, the term of this patent is extended or adjusted under 35 U.S.C. 154(b) by 1339 days.

(21) Appl. No.: 12/330,691

(22) Filed: Dec. 9, 2008

(65) Prior Publication Data

US 2009/0304391 A1    Dec. 10, 2009

Related U.S. Application Data

(60) Provisional application No. 61/060,201, filed on Jun. 10, 2008.

(51) Int. Cl.
| | |
|---|---|
| *H04B 10/00* | (2013.01) |
| *H04B 10/532* | (2013.01) |
| *H04B 10/2513* | (2013.01) |
| *H04B 10/69* | (2013.01) |

(52) U.S. Cl.
CPC ...... *H04B 10/532* (2013.01); *H04B 10/25137* (2013.01); *H04B 10/6972* (2013.01); *H04B 2210/252* (2013.01); *H04B 2210/254* (2013.01)

(58) Field of Classification Search
USPC .......... 398/158, 159, 208–214, 147
See application file for complete search history.

(56) References Cited

U.S. PATENT DOCUMENTS

| | | | |
|---|---|---|---|
| 6,574,389 B1 * | 6/2003 | Schemmann | H04B 10/2507 385/24 |
| 7,382,984 B2 | 6/2008 | McNicol et al. | |
| 7,418,212 B1 * | 8/2008 | Bontu | H04L 25/061 375/232 |

(Continued)

OTHER PUBLICATIONS

Nortel Networks; White Paper "Breaking the physical barriers with electronic Dynamically Compensating Optics (eDCO)"; Publication; Apr. 27, 2006; Issue No. NN115923; 6 pages.

*Primary Examiner* — Ken N Vanderpuye
*Assistant Examiner* — Amritbir Sandhu
(74) *Attorney, Agent, or Firm* — Clements Bernard PLLC; Christopher L. Bernard; Lawrence A. Baratta, Jr.

(57) ABSTRACT

Described are an optical communications system and a method that allow for compensation of chromatic dispersion and polarization mode dispersion imparted to a communications signal propagating through an optical link. The system is based on a cost-effective optical transport architecture that accommodates baud rates exceeding 15 Gbaud and eliminates the need for costly optical dispersion compensators. Compensation for polarization mode dispersion is performed at the receiver using nonlinear processing. Advantageously, direct detection modulation using inexpensive electro-optic system components can be used in place of more costly and complex coherent and differential modulation formats. Digital filtering can be performed at the transmitter and the input signal can be inverted based on the nonlinearity of the transmitter electro-optic components. Consequently, the bandwidth and linearity requirements for the transmitter electro-optic components are relaxed, and cost reductions are realized.

23 Claims, 4 Drawing Sheets

(56) References Cited

U.S. PATENT DOCUMENTS

| | | | |
|---|---|---|---|
| 7,689,074 B2* | 3/2010 | Isomura | H04B 10/677 385/15 |
| 7,747,177 B2* | 6/2010 | Chen et al. | 398/206 |
| 7,756,421 B2* | 7/2010 | Roberts | H04B 10/2543 398/158 |
| 7,873,286 B2* | 1/2011 | Frankel | H04B 10/2569 398/213 |
| 2004/0067064 A1* | 4/2004 | McNicol | H04B 10/25137 398/158 |
| 2004/0105682 A1* | 6/2004 | Roberts | H04B 10/2572 398/147 |
| 2004/0190906 A1* | 9/2004 | Jain | H04B 10/2572 398/147 |
| 2004/0218933 A1* | 11/2004 | Fludger et al. | 398/205 |
| 2005/0063476 A1* | 3/2005 | Miller et al. | 375/242 |
| 2005/0078964 A1* | 4/2005 | Takahara | H04B 10/2569 398/147 |
| 2006/0204171 A1* | 9/2006 | Cai | H04B 10/25253 385/24 |
| 2009/0028576 A1* | 1/2009 | Elahmadi | H04B 10/25137 398/147 |
| 2009/0074427 A1* | 3/2009 | Liu | H04B 10/2513 398/205 |
| 2009/0086810 A1* | 4/2009 | Hidaka | 375/234 |
| 2009/0103921 A1* | 4/2009 | Frankel | H04B 10/2569 398/65 |
| 2009/0238578 A1* | 9/2009 | Taylor | H04B 10/25133 398/147 |
| 2009/0252502 A1* | 10/2009 | Zhu | H04B 10/50572 398/188 |
| 2010/0034542 A1* | 2/2010 | Armstrong | H04B 10/5053 398/158 |
| 2010/0135656 A1* | 6/2010 | Khurgin | H04B 10/61 398/43 |
| 2012/0141121 A1* | 6/2012 | Itoh | H04B 10/294 398/34 |
| 2012/0155883 A1* | 6/2012 | Tanaka | H04B 10/6161 398/115 |
| 2012/0313701 A1* | 12/2012 | Khlat | H02M 3/07 330/127 |

* cited by examiner

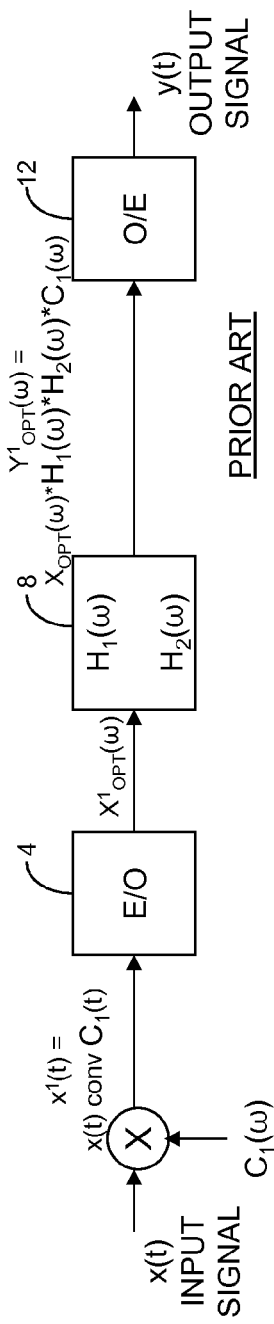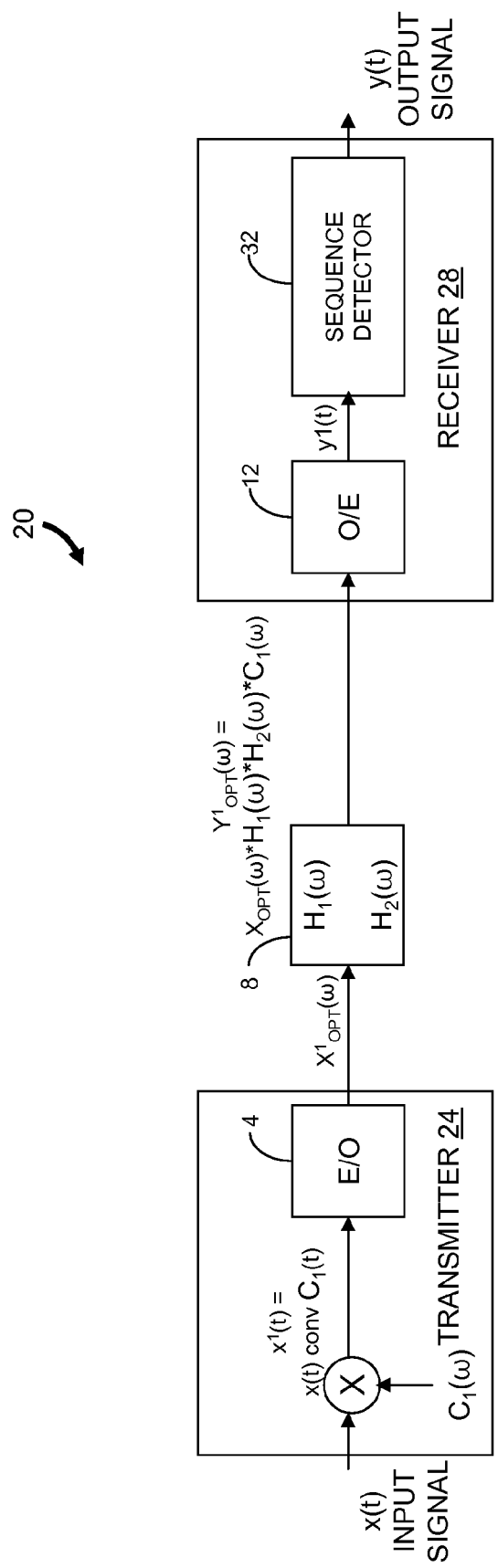

OPTICAL COMMUNICATIONS SYSTEM HAVING CHROMATIC DISPERSION AND POLARIZATION MODE DISPERSION COMPENSATION

RELATED APPLICATION

This application claims the benefit of the earlier filing date of U.S. Provisional Patent Application Ser. No. 61/060,201, filed Jun. 10, 2008, titled "Low Cost, High Speed, Dispersion and PMD Robust Optical Transmission Architecture," the entirety of which is incorporated herein by reference.

FIELD OF THE INVENTION

The invention relates generally to optical communications networks. More particularly, the invention relates to a method for compensating for chromatic dispersion and polarization mode dispersion imparted to a communications signal propagating through an optical link.

BACKGROUND OF THE INVENTION

Optical communications systems typically include a pair of network nodes connected by an optical waveguide (i.e., optical fiber) link. Within each network node, communications signals are converted into electrical signals for signal regeneration and/or routing, and converted into optical signals for transmission through an optical link to another node. The optical link between the network nodes is typically made up of multiple concatenated optical components, including one or more optical fiber spans interconnected by optical amplifiers.

The use of concatenated optical components within a link enables improved signal reach, that is, the distance that an optical signal can be conveyed before being reconverted into electrical form for regeneration. For example, optical signals are progressively attenuated during propagation through a span, and amplified by an optical amplifier (e.g., an erbium doped fiber amplifier (EDFA)) prior to being launched into the next span; however, signal degradation due to noise and dispersion effects increases as the signal propagates through the fiber. Consequently, noise and dispersion degradation are significant factors in limiting the maximum possible signal reach.

Chromatic dispersion, also known as group velocity dispersion, in a single mode fiber is a result of two mechanisms: (1) waveguide dispersion wherein different wavelengths of light propagate in the fiber at different speeds; and (2) material dispersion wherein the phase velocity of plane waves in glass varies with wavelength. Hereinafter, references to "chromatic dispersion" are understood to mean the sum total of group velocity dispersion effects.

Mathematically, first order chromatic dispersion is the derivative of the time delay of the optical path with respect to wavelength. The effect of chromatic dispersion is measured in picoseconds of arrival time spread per nanometer of line width per kilometer of length (ps $nm^{-1}$ $km^{-1}$). The magnitudes of waveguide dispersion and material dispersion vary with wavelength, and at some wavelengths the two effects act in opposite senses. The amount of chromatic dispersion present in a link can also vary with the temperature of the fiber and any change in the communication path introduced by optical switching. Chromatic dispersion in an optical fiber presents a serious problem when using a light source having a non-ideal spectrum, for example, a broad or multi-line light source, or when high data rates are required (e.g., over 2 GB/s).

Polarization mode dispersion (PMD), also known as differential group delay, is a result of imperfections in the optical fiber that lead to different propagation speeds for orthogonal polarization components of an optical signal. The imperfections can be due to geometric asymmetry of the fiber core and material birefringence. Both effects can arise from manufacturing processes and from thermal and mechanical stresses present in the field. Moreover, the magnitude of polarization mode dispersion can vary rapidly in time (e.g., at rates that exceed 10 KHz).

Chromatic dispersion is proportional to the square of the baud rate of an optical signal while polarization mode dispersion is linearly proportional to the baud rate. Consequently, chromatic dispersion is the limiting factor for high baud rate (e.g., greater than 10 Gbaud) communication systems for lengths exceeding a few kilometers.

Various modulation formats and techniques for receiver and transmitter equalization to mitigate the effects of chromatic dispersion and polarization mode dispersion are known in the art. For example, multi-level intensity modulation with direct detection (IM-DD) using four-level amplitude shift keying (ASK-4) has been used to achieve the desired dispersion tolerance. In effect the baud rate is reduced by a factor of two, leading to an improvement in dispersion tolerance by a factor of four; however, the multi-level modulation results in a noise penalty of at least 5 dB compared to a non-return-to-zero (NRZ) signal at twice the baud rate. Consequently, the reach of the system is reduced by almost a factor of four. Differential quadrature phase shift keying (DQPSK) can be used to achieve a dispersion tolerance and noise tolerance similar to direct detection at half the baud rate; however, the additional expense to implement a DQPSK format makes it less cost-effective.

Receiver equalization techniques for improved direct detection performance are known. These techniques include maximum likelihood sequence estimation (MLSE) equalization, maximum a posteriori (MAP) equalization and turbo encoding/decoding. For example, a receiver for 10 Gbaud direct detection using MLSE-5 can compensate for chromatic dispersion in up to 400 km of optical fiber; however, to increase the MLSE-5 by an additional state approximately doubles the gate count of the equalizer to obtain an additional 50 km of chromatic dispersion tolerance. At rates greater than 10 Gbaud, the MLSE equalizer alone is insufficient to compensate for chromatic dispersion. For example, an MLSE-5 equalizer for 40 Gbaud only compensates for up to approximately 20 km of chromatic dispersion. Quadrupling the gate count for an MLSE-7 receiver only incrementally increases the chromatic dispersion compensation to approximately 28 km as an MLSE equalizer alone does not scale with baud rate to compensate for chromatic dispersion. This lack of scalability for chromatic dispersion compensation with baud rate similarly applies to other decoders such as those used for MAP equalization and turbo decoding.

Other techniques such as a chirped pulse technique described in U.S. Pat. No. 4,979,234 titled "Saturated Semiconductor Laser Amplifier for Compensation of Optical Fibre Dispersion," for managing chromatic dispersion in optical systems are known; however, these techniques also do not scale well with increasing baud rate. For example, application of the chirped pulse technique can achieve a doubling of the dispersion tolerance so that the dispersion tolerance for a 40 Gbps signal improves from about 3.6 km to about 7.2 km; however, this improvement is an insignificant change for longer reach communication systems.

For the purposes of analyzing the effects of chromatic dispersion and polarization mode dispersion, it is convenient to represent an optical communications system using the block diagram of FIG. 1. In this case, the transmitter is represented by an electrical-to-optical converter (E/O) 4 which operates to convert an electrical input signal x(t) into a corresponding optical signal $X_{OPT}(\omega))$ for transmission to a receiver. The optical fiber span 8, including all concatenated components, is represented by a transfer function $H_1(\omega))H_2(\omega))$, where the components are normally complex, $H_1(\omega))$ represents the contribution due to chromatic dispersion and $H_2(\omega))$ represents the contribution due to polarization mode dispersion. The receiver is represented by an optical-to-electrical converter (O/E) 12 which detects the instantaneous power of optical signal $Y_{OPT}(\Omega))$ received through the optical fiber span 8, and generates a corresponding electrical output signal y(t).

In general, the output signal y(t) represents a distorted version of the input data signal x(t). While it is highly desirable for $H_1(\omega))H_2(\omega))$ to be approximately one, this is rarely the case. Accordingly, it is frequently necessary to utilize at least some form of compensation, so that the original input data signal x(t) can be detected within the distorted output signal y(t).

One common method of addressing signal degradation due to chromatic dispersion in high-bandwidth communications systems is to insert one or more optical dispersion compensators 16, represented in FIG. 2 by the compensation function $C(\omega))$, to compensate for chromatic dispersion caused by the remainder of the link. Since chromatic dispersion is largely insensitive to polarization and varies little over time, compensators based on bulk dispersion compensation fiber often provide satisfactory performance. Some compensators also provide a time variable amount of compensation which enables mitigation of time-variant dispersion effects. In either case, the compensators are intended to at least partially offset the signal distortions. The compensation function $C(\omega))$ is a dispersive function that is selected to optimize performance of the link for chromatic dispersion but in general does not address degradation due to polarization mode dispersion introduced by the link. The compensation function $C(\omega))$ is preferably equivalent to the complex conjugate of the chromatic dispersion transfer function $H_1(\omega))$ in which case $H_1(\omega)) C(\omega))=1$. If polarization mode dispersion were not present, the combined effect of $H_1(\omega))$ and $C(\omega))$ would be an undistorted output signal $Y_{OPT}(\omega))$ that exactly corresponds to the original optical signal $X_{OPT}(\omega))$. Limitations of optical components and the time-varying amount of compensation required make this objective difficult to achieve. Additionally, the compensators represent an additional cost and introduce significant optical losses. These losses are offset by means of additional optical gain which introduces more optical noise. The additional (or higher-performance) optical amplifiers required to provide this increased gain further increase the total cost of the communications system. In addition, the presence of compensators for chromatic dispersion and high performance amplifiers distributed along the length of the link provides a significant technical barrier to system evolution. For example, implementation of optical switching (e.g. at the transmitter and/or receiver end of the link, or at an intermediate site without electrical termination) necessarily requires adjustment of optical amplifiers in order to accommodate changing energy states within the link.

U.S. Pat. No. 7,382,984 titled "Electrical Domain Compensation of Optical Dispersion in an Optical Communications System," incorporated herein by reference, describes a method to compensate for chromatic dispersion in an optical communications system. According to the method and with reference to FIG. 3, a communications signal x(t) is modulated in the electrical domain according to a chromatic dispersion compensation function $C_1(\omega))$. The predistorted electrical signal $x^1(t)$ is used to modulate an optical source to generate a corresponding optical signal $X^1_{OPT}(\omega))$ for transmission through the optical fiber span 8. In effect, the E-field of the optical signal $X^1_{OPT}(\omega))$ is controlled according to the predistorted electrical signal $x^1(t)$. Thus the optical signal $Y^1_{OPT}(\omega))$ present at the receiver 12 has little or no chromatic dispersion; however, polarization mode dispersion typically remains. In a complementary manner, an optical communications system can utilize a chromatic dispersion function in the electrical domain at the receiver; however, this represents a limited capability for direct detection modulation systems as the compensation function is nonlinear and the phase information is not available.

Compensation for polarization mode dispersion requires the tracking of variations in the polarization components of the optical signal $X^1_{OPT}(\omega))$ and the differential delay for these components. To compensate for polarization mode dispersion at the transmitter, access to both polarization components is required, resulting in a significant additional cost to the communications system. Moreover, the polarization states and the polarization mode dispersion $H_2(\omega))$ introduced by the optical fiber span 8 can vary rapidly over time. For example, the frequency of the variations in polarization mode dispersion can exceed 10 KHz. The transmitter requires knowledge of the polarization states and differential delay; however, this information is only available at the receiver. Although the receiver can send this information to the transmitter, the latency in reporting the information to the transmitter can make compensation of polarization mode dispersion at the transmitter impractical. More specifically, by the time the information is received at the transmitter, the polarization mode dispersion imparted by the optical link may have changed so that the information is no longer useful.

The present invention addresses the problems set forth above and provides a convenient and cost-effective technique for mitigating the effects of chromatic dispersion and polarization mode dispersion on high bandwidth optical signals.

SUMMARY OF THE INVENTION

In one aspect, the invention features a method for compensating dispersion imparted to a communications signal propagating through an optical link. An electrical input signal to be propagated through the optical link is digitally processed according to a first compensation function to generate a predistorted electrical signal. The first compensation function is determined to substantially mitigate chromatic dispersion imparted to the communications signal by the optical link. The predistorted electrical signal is converted into a predistorted optical signal for transmission through the optical link. A receiver electrical signal is generated in response to a detection of the predistorted optical signal after propagation through the optical link. The receiver electrical signal is digitally processed according to a second compensation function to generate an output signal.

In another aspect, the invention features an optical communications system for compensating dispersion imparted to a communications signal propagated through an optical link. The optical communications system includes a transmitter processor, an optical modulator, a detector and a receiver processor. The transmitter processor is configured for digitally processing the communications signal to be propagated through the optical link, based on a first compensation function, to generate a predistorted digital signal. The first compensation function is determined to substantially mitigate chromatic dispersion imparted by the optical link. The optical modulator is in communication with the transmitter processor and is adapted for converting the predistorted digital signal into a predistorted optical signal for transmission through the optical link. The detector receives the predistorted optical signal after transmission through the optical link and responds by generating a receiver electrical signal. The receiver processor is in communication with the detector and is configured for digitally processing the receiver electrical signal, based on a second compensation function, to generate an output signal.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

FIG. 3 is a block diagram illustrating transmission of a communications signal through an optical communications system after modulation of the communications signal in the electrical domain according to a chromatic dispersion compensation function.

FIG. 4 is a block diagram illustrating transmission of a communications signal through an embodiment of an optical communications system according to the invention.

DETAILED DESCRIPTION

Figure 1:
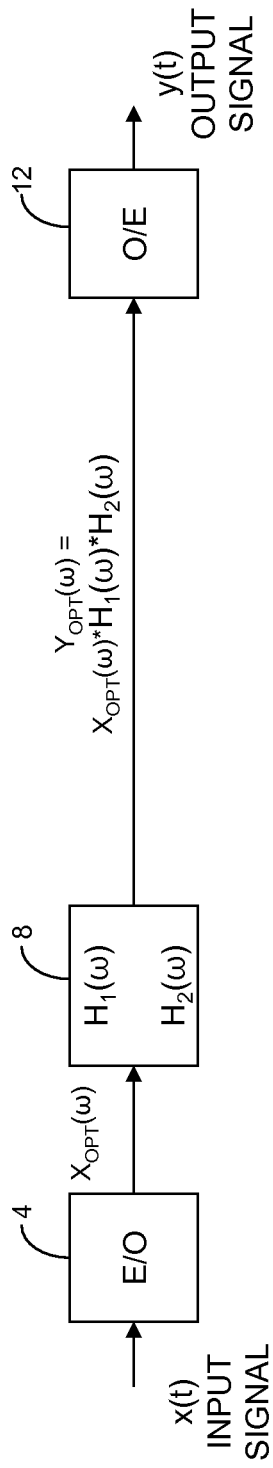
FIG. 1 is a block diagram illustrating transmission of a communications signal through a conventional optical communications system affected by chromatic dispersion and polarization mode dispersion.
Figure 2:
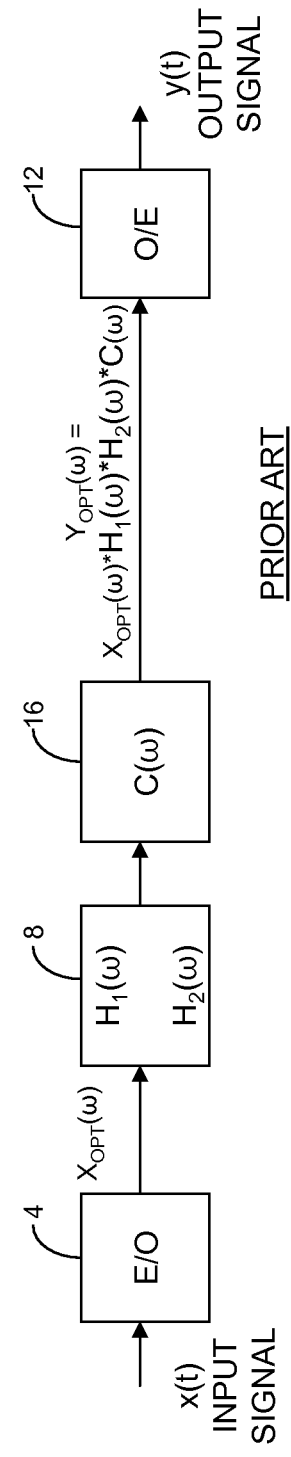
FIG. 2 is a block diagram illustrating transmission of a communications signal through an optical communications system having one at least one optical dispersion compensator.

Reference will now be made in detail to the preferred embodiments of the invention, examples of which are illustrated in the accompanying drawings. While the invention is described in conjunction with the preferred embodiments, it should be understood that the invention is not limited to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention; however, it will be obvious to one of ordinary skill in the art that the present invention can be practiced without these specific details. In other instances, well-known methods, procedures, and components have not been described in detail so as not to unnecessarily obscure aspects of the present invention. At times, concepts disclosed in this discussion of embodiments of the present invention will be made more readily apparent by reference to the figures.

The invention provides a cost-effective optical transport architecture for baud rates exceeding 15 Gbaud that eliminates the need for costly optical compensators for chromatic dispersion and polarization mode dispersion. Advantageously, direct detection modulation using inexpensive electro-optic system components can be used instead of more costly and complex coherent or differential modulation formats. In a preferred embodiment, digital filtering is performed at the transmitter and the input signal is "inverted" according to the nonlinearity of the transmitter electro-optic components. Consequently, the demands on bandwidth and linearity of the transmitter electro-optic components are reduced, and further cost reductions are realized.

Referring to FIG. 4, an embodiment of an optical communications system 20 for compensating chromatic dispersion and polarization mode dispersion of a communications signal propagating through an optical link is shown. The system 20 includes a transmitter 24 optically coupled to a receiver 28 through an optical link 8. Dynamic compensation for chromatic dispersion is introduced at the transmitter 24 in the electrical domain and the resulting predistorted electrical signal $x_1(t)$ in analog format is used to drive the E/O converter 4. The E/O converter 4 launches a predistorted optical signal $X^1_{OPT}(\omega))$ into the optical link 8 and a modified optical signal $Y^1_{OPT}(\omega))$ is received at the transmitter 28. The predistortion compensates for the chromatic dispersion $H_1(\omega))$ imparted by the link 8; however, the effect of polarization mode dispersion $H_2(\omega))$ imparted by the link 8 remains in the received optical signal $Y^1_{OPT}(\omega))$. In effect, the chromatic dispersion compensation is performed coherently in the optical E-field in the transmitter 24 therefore a significant mitigation of chromatic dispersion can be achieved by using efficient digital signal processing methods such as fast Fourier transforms (FFTs) which are linearly proportional to the amount of dispersion to be compensated.

The receiver 28 of the optical communications system of the present invention includes a sequence detector 32 that provides dynamic compensation for polarization mode dispersion in the electrical domain. Consequently, the need for costly optical polarization mode dispersion compensation is eliminated. Without compensating for chromatic dispersion at the transmitter 24, the receiver 28 would have diminished capacity to compensate for polarization mode dispersion. Thus, according to the invention, the task of compensating for chromatic dispersion is performed by the transmitter 24 and the task of compensating for polarization mode dispersion is performed by the receiver 28. This division of tasks results in significant performance and cost benefits.

The sequence detector 32 operates on the electrical signal $y^1(t)$ provided by the O/E converter 12. Advantageously, polarization mode dispersion is only proportional to the baud rate thus the burden on the sequence detector 32 scales directly with higher baud rate signals. Polarization mode dispersion can vary in time at rates that can exceed 10 KHz. Unlike the transmitter 24, the receiver 28 can track these changes since it is not subject to the inherent latency of the optical link 8. For example, latency can exceed 1 ms in optical links making tracking of polarization mode dispersion impractical for the transmitter 24.

Figure 5:
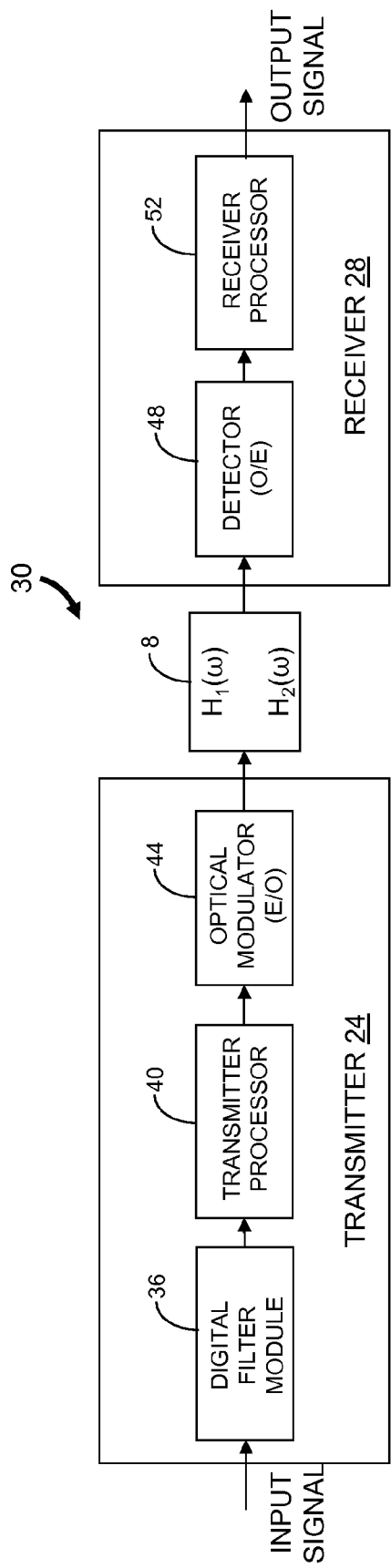
FIG. 5 is a block diagram illustrating transmission of a communications signal through another embodiment of an optical communications system according to the invention.

In one embodiment shown in FIG. 5, the optical communications system 30 of the present invention includes a digital filter module 36 to perform E-field digital low pass filtering, a transmitter processor 40 to implement the E-field optical dispersion compensation, and an E/O converter 44 having low cost electro-optic components. The transmitter 24 is adapted for direct detection modulation although in other embodiments other modulation formats based on differential detection and coherent optical detection can be utilized. For example, differential implementations of binary phase shift keying (BPSK), quadrature phase shift keying (QPSK) and quadrature amplitude modulation (QAMxx) can be employed in other embodiments using a differential detector having optical delay and add processing. Alternatively, the coherent implementations of BPSK, QPSK and QAM1xx based on a detector using a local oscillator for coherent detection. The receiver 28 for the illustrated embodiment includes an O/E converter 48 and a receiver processor 52 that performs digital sequence detection. Processing can be performed at rates that exceed the baud rate T of the communications signal applied at the system input (e.g., T=1/2 or T=3/4 the processing rate); however, in some embodiments the processors 40 and 52 are operated at the baud rate T, (e.g., for communications systems operating at 15 Gbaud or greater where the limits of conventional analog-to-digital converter (ADC) and digital-to-analog converter (DAC) technology may be reached).

Figure 6:
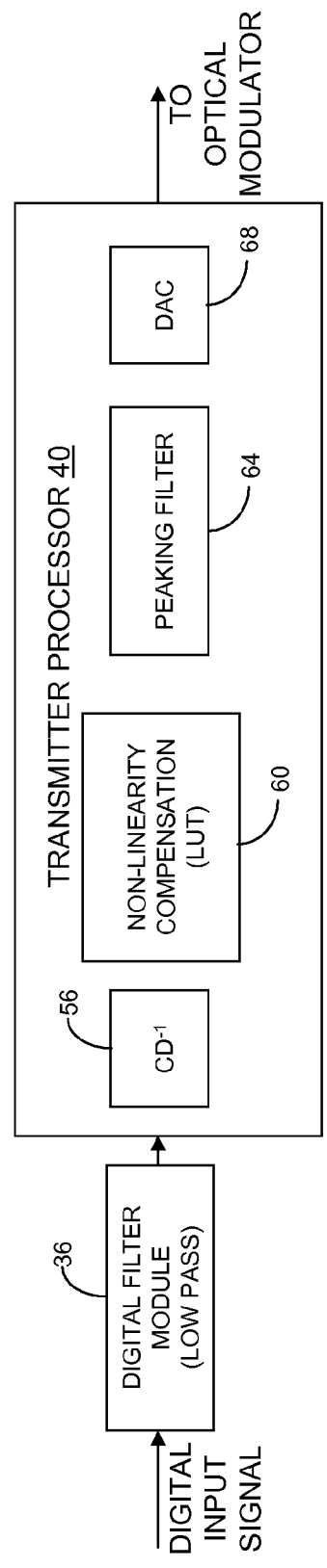
FIG. 6 illustrates the elements of the transmitter of FIG. 5 used to process an input signal in the electrical domain according to an embodiment of the invention.

FIG. 6 illustrates the elements of the transmitter 24 of FIG. 5 used to process the input signal in the electrical domain. The digital signal applied to the transmitter 24 is first digitally low pass filtered by the digital filter module 36. Digital filtering results in a signal having reduced frequency content, enabling an NRZ signal to be used with reduced bandwidth standard electro-optic components and resulting in significant cost savings. In a preferred embodiment, the bandwidth of the predistorted optical signal is no more than half the baud rate of the optical communications system. As a result of the digital filtering, inter symbol interference (ISI) is present in the signal at the receiver 28; however, sequence detection performed at the receiver 28 enables operation at the reduced transmitter bandwidth and cost by correcting for the ISI with only a minor noise increase.

The digitally-filtered signal is received by the transmitter processor 40 where it is predistorted by the chromatic dispersion inversion (CD$^{-1}$) module 56 to compensate for chromatic dispersion in the optical link. The predistorted signal is processed by a nonlinearity compensation module 60 and a peaking filter module 64 prior to conversion to an analog signal by a digital-to-analog converter (DAC) 68 for driving the E/O modulator 44 (FIG. 5). Typically, the functional relationship between the analog electrical signal applied to the E/O modulator 44 and the resulting optical signal generated by the E/O modulator 44 is nonlinear. The nonlinearity compensation module 60 includes a set of nonlinear inverse operators to linearize the functional relationship.

Figure 7:
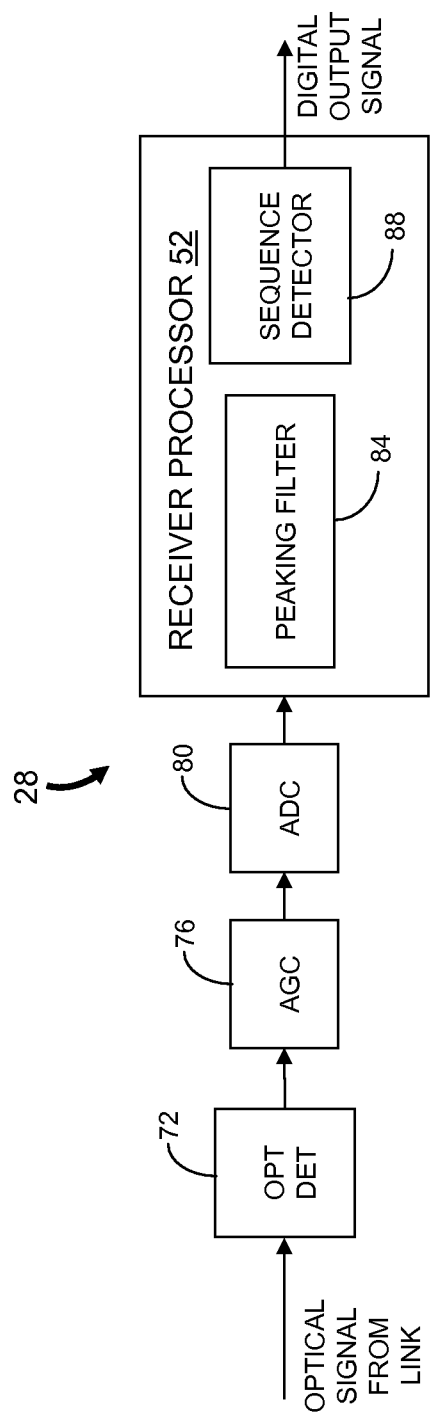
FIG. 7 illustrates the elements of the receiver of FIG. 5 used to process the optical signal after transmission over the optical link according to an embodiment of the invention.

FIG. 7 illustrates the elements of the receiver 28 used to process the optical signal transmitted over the optical link. The receiver 28 includes an optical detector 72, automatic gain control (AGC) module 76 and analog-to-digital converter (ADC) 80. In a preferred embodiment utilizing direct detection, the optical detector 72 can be any of a variety of detectors known in the art that are responsive to the intensity of the incident optical signal and that have response times to accommodate the baud rate of the optical communications system. In alternative embodiments differential detection or coherent detection can be employed and optical processing, including the use of delay-and-add functions, can be used. The received optical signal is converted by the optical detector 72 and AGC module 76 into an analog receiver electrical signal that is converted into a digital receiver electrical signal by the ADC 80. In one embodiment, the sampling rate of the ADC 80 is determined according to the low pass filtering performed at the transmitter 24.

The receiver 28 also includes a receiver processor 52 that has a peaking filter 84 and a sequence detector 88. The digital signal is first processed by the peaking filter 84 and then provided to the sequence detector 88 which corrects for ISI resulting from the low pass filtering performed by the transmitter 24. The sequence detector 88 can be any of a variety of types of sequence detectors known in the art, such as an MLSE detector, a Viterbi decoder or a MAP sequence detector.

While the invention has been shown and described with reference to specific embodiments, it should be understood by those skilled in the art that various changes in form and detail may be made therein without departing from the spirit and scope of the invention as recited in the accompanying claims.

What is claimed is:

1. A method for compensating for dispersion imparted to a communications signal propagating through an optical link in an optical communication system, the method comprising:

digitally processing an electrical input signal to be propagated through the optical link, according to a first compensation function, to generate a predistorted electrical signal, the first compensation function determined to mitigate chromatic dispersion imparted to the communications signal by the optical link;

filtering the predistorted digital signal through a transmitter peaking filter;

converting the predistorted electrical signal into a predistorted optical signal for transmission through the optical link after the filtering;

generating a receiver electrical signal in response to a detection of the predistorted optical signal after propagation through the optical link; and digitally processing the receiver electrical signal according to a second compensation function to generate an output signal, the second compensation function determined to mitigate polarization mode dispersion, an extent of the mitigation of the polarization mode dispersion being dependent upon an extent to which the chromatic dispersion is mitigated, wherein the digitally processing the electrical input signal and the digitally processing the receiver electrical signal compensate for chromatic dispersion and polarization mode dispersion, respectively, at baud rates exceeding 15 Gbaud.

2. The method of claim 1 wherein digitally processing the electrical input signal comprises compensating for a nonlinearity imparted to the communications signal by the conversion of the predistorted electrical signal into the predistorted optical signal.

3. The method of claim 1 wherein digitally processing the electrical input signal further comprises linear filtering of the electrical input signal.

4. The method of claim 1 wherein digitally processing the receiver electrical signal comprises performing a sequence detection to mitigate intersymbol interference in the receiver electrical signal.

5. The method of claim 1 wherein digitally processing the electrical input signal comprises:
generating successive digital values of the predistorted electrical signal based on the electrical input signal input to the first compensation function; and
converting each successive digital value into a corresponding analog value of the predistorted electrical signal.

6. The method of claim 5 wherein a baud rate of the electrical input signal to be propagated exceeds one half of a baud rate of the successive digital values.

7. The method of claim 5 wherein a baud rate of the electrical input signal to be propagated exceeds 3/4 of a baud rate of the successive digital values.

8. The method of claim 6 wherein a baud rate of the electrical input signal to be propagated is substantially equal to a baud rate of the successive digital values.

9. The method of claim 1 further comprising determining the first compensation function prior to digitally processing the electrical input signal.

10. The method of claim 1 wherein the receiver electrical signal is generated in response to a direct detection of the predistorted optical signal after propagation through the optical link.

11. The method of claim 1 wherein the receiver electrical signal is generated in response to a differential detection of the predistorted optical signal after propagation through the optical link.

12. The method of claim 1 wherein the receiver electrical signal is generated in response to a coherent detection of the predistorted optical signal after propagation through the optical link.

13. The method of claim 1 wherein the detection of the predistorted optical signal after propagation through the optical link comprises optical processing.

14. The method of claim 13 wherein the optical processing comprises performing a delay-and-add function.

15. An optical communications system for compensating for dispersion imparted to a communications signal propagated through an optical link, comprising:
a transmitter processor configured to digitally process the communications signal to be propagated through the optical link, based on a first compensation function, to generate a predistorted digital signal, wherein the first compensation function is determined to mitigate chromatic dispersion imparted by the optical link;
an optical modulator in communication with the transmitter processor and configured to convert the predistorted digital signal into a predistorted optical signal for transmission through the optical link;
a transmitter peaking filter module configured to process the predistorted digital signal prior to conversion to the predistorted optical signal;
a detector configured to receive the predistorted optical signal transmitted through the optical link and to generate a receiver electrical signal in response thereto; and
a receiver processor in communication with the detector and configured to digitally process the receiver electrical signal, based on a second compensation function, to generate an output signal, the second compensation function determined to mitigate polarization mode dispersion, an extent of the mitigation of the polarization mode dispersion being dependent upon an extent to which the chromatic dispersion is mitigated,
wherein the transmitter and receiver are configured to compensate for chromatic dispersion and polarization mode dispersion, respectively, at baud rates exceeding 15 Gbaud.

16. The system of claim 15 further comprising a digital filter module in communication with the transmitter processor and configured to receive the communications signal to be propagated through the optical link and to generate and provide to the transmitter processor a linearly-filtered digital signal.

17. The system of claim 15 further comprising a digital-to-analog conversion module in communication with the transmitter processor and the optical modulator, the digitalto-analog conversion module configured to convert the predistorted digital signal from the transmitter processor into a predistorted analog signal that is provided to the optical modulator.

18. The system of claim 15 further comprising an analog-to-digital conversion module in communication with the detector and the receiver processor, the analog-to-digital conversion module configured to convert the receiver electrical signal from an analog signal format into a receiver electrical signal having a digital format that is provided to the receiver processor.

19. The system of claim 15, wherein the transmitter processor is further configured to perform an inversion function to compensate for a nonlinear response of the optical modulator to an applied electrical signal.

20. The system of claim 15 wherein the receiver processor comprises a sequence detector configured to mitigate intersymbol interference during the digital processing of the receiver electrical signal.

21. The system of claim 20 wherein the digital processing comprises performing a maximum likelihood sequence estimation equalization, a maximum a posteriori equalization or a Viterbi decoding.

22. The system of claim 15, wherein the detector is configured to generate the receiver electrical signal in response to one of a direct detection, a differential detection and a coherent detection of the predistorted optical signal transmitted through the optical link.

23. The system of claim 15, further comprising a receiver peaking filter module configured to process the receiver electrical signal prior to providing the receiver electrical signal to a sequence detector.

* * * * *